(12) United States Patent
Hsu

(10) Patent No.: US 8,115,974 B2
(45) Date of Patent: *Feb. 14, 2012

(54) DEVICE TO TRANSFER PHOTO IMAGES INTO DIGITAL DATA

(75) Inventor: Chun Chieh Hsu, Chung Ho (TW)

(73) Assignee: CRS Electronic Co., Ltd., Taipei Shien (TW)

( * ) Notice: Subject to any disclaimer, the term of this patent is extended or adjusted under 35 U.S.C. 154(b) by 1067 days.

This patent is subject to a terminal disclaimer.

(21) Appl. No.: 12/007,605

(22) Filed: Jan. 14, 2008

(65) Prior Publication Data

US 2009/0180135 A1 Jul. 16, 2009

(51) Int. Cl.
*H04N 1/04* (2006.01)
(52) U.S. Cl. ........................................ 358/474; 358/471
(58) Field of Classification Search .................. 358/487, 358/506, 505, 474, 909.1, 471, 401, 501; 348/231.99, 373, E5.024, 96–98; 250/234, 250/216, 239
See application file for complete search history.

(56) References Cited

U.S. PATENT DOCUMENTS

| | | | |
|---|---|---|---|
| 6,331,886 B2* | 12/2001 | Nagano et al. | 355/75 |
| 7,940,326 B2* | 5/2011 | Hsu | 348/370 |
| 2004/0179373 A1* | 9/2004 | Tamai et al. | 362/555 |
| 2009/0180006 A1* | 7/2009 | Hsu | 348/231.99 |
| 2009/0257096 A1* | 10/2009 | Hsu | 358/401 |

* cited by examiner

*Primary Examiner* — Cheukfan Lee
(74) *Attorney, Agent, or Firm* — Rosenberg, Klein & Lee

(57) ABSTRACT

A kind of device to transfer photo images into digital data includes a body wherein photo taking mechanisms are set inside and insert-fit grooves and positioning mechanisms are set with internal lighting assembling plates at the other side. The integrated photo clamps for clamping photos are put in the interior of the body through insert-fit grooves. By usage of simple operations, the images on the taken photos by photo taking mechanisms can be transferred into digital data for convenient storage, modification, or copying then printing the new photos. Thus, the present invention is rich of convenience and advancement.

3 Claims, 4 Drawing Sheets

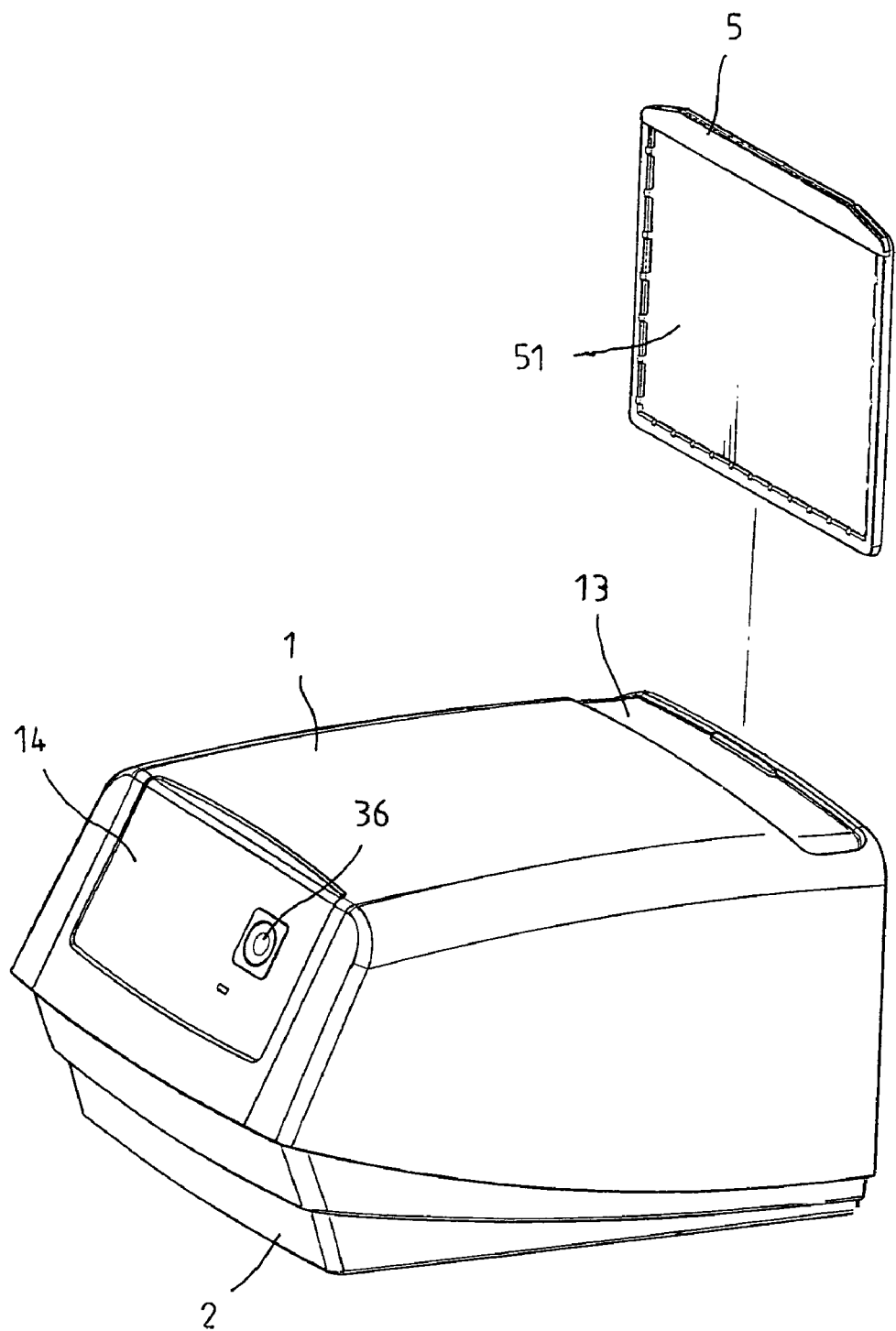
F I G. 1

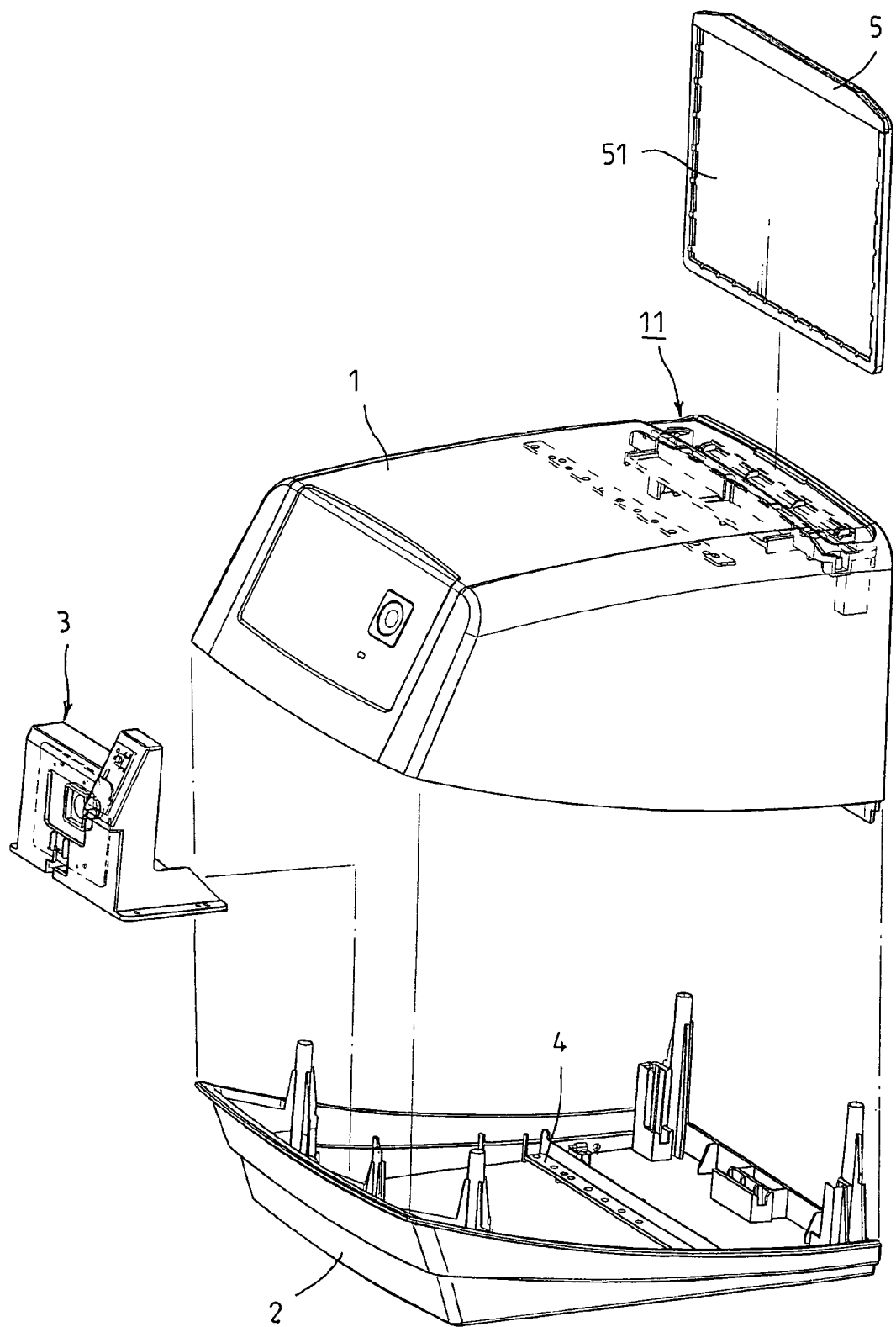
F I G. 2

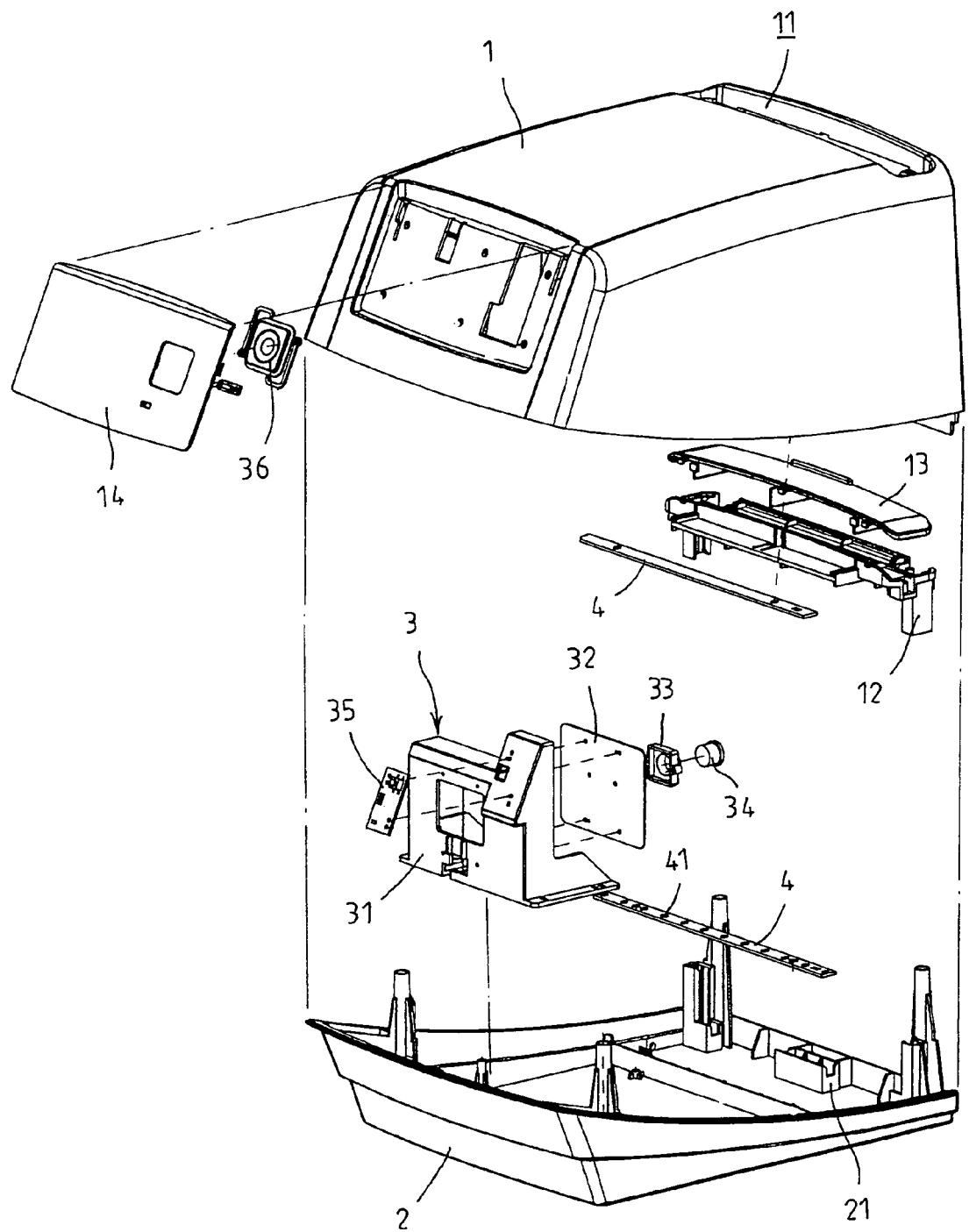
F I G. 3

DEVICE TO TRANSFER PHOTO IMAGES INTO DIGITAL DATA

BACKGROUND OF THE INVENTION

The former photos are normally gotten by utilizing the films for photo taking through traditional cameras then printing. Once the films are lost, the only thing left will be the photos and unable to be reproduced. If the photos are damaged or lost, the recorded pretty image memory of the past will be hard to be searched. The known way to solve the trouble of the loss of films utilize the camera to aim at photos to proceed the reproducing then get the new films for provision of storage and the saving of new printing photos. However, the image effects gotten from the reproducing photos by this method are hard to be controlled. The same quality in the reproducing photos cannot be secured without expertise and professional equipments.

SUMMARY OF THE INVENTION

The main object of the present invention is to provide a kind of device to transfer photo images into digital data. By usage of a clever assembly structure, the ordinary users can transfer the photo images into digital data by simple operations for convenient storage, modification or copying then printing the new photos. Thus, the known advantages are overcome. Now, accompanying with drawings, the character and structure of the present invention will be disclosed as following.

BRIEF DESCRIPTION OF THE DRAWINGS

FIG. 1 is an outside appearance drawing of the present invention.

FIG. 2 is a partial bi-sectional analytic drawing of the present invention.

FIG. 3 is a detailed bi-sectional analytic drawing of the present invention.

DETAILED DESCRIPTION OF THE PREFERRED EMBODIMENT

Figure 4:
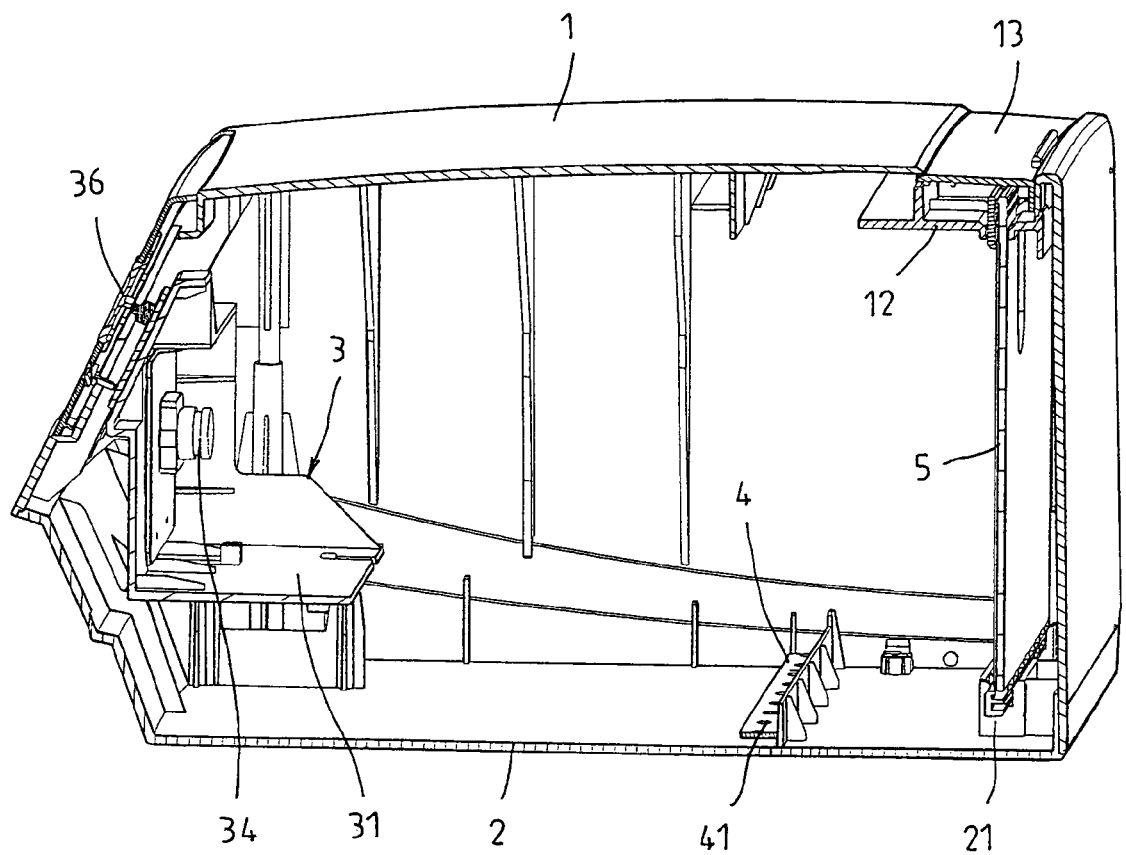
FIG. 4 is an internal assembling structural layout drawing of the present invention

Please refer to those shown in FIGS. 1 and 2. The present invention is a kind of device to transfer photo images into digital data including a body (1), a lower shell (2), a photo taking mechanism (3) and a LED (light emitting diode) assembling plate (4), wherein the body (1) and the lower shell (2) are assembled as a shallow structure. The insert-fit grooves (11) are set at sides of the top portion of body (1) to provide an insertion for a photo clamp (5). The photos (51) taking from photo clamps (5) through internal photo taking mechanisms (3) are transferred into digital data for convenient long term storage, and the further modification and copying then printing the new photos are possible. Thus, the present invention is rich of effects of convenience and accurate reproducing.

Please refer to those shown in FIGS. 1 and 2 again. The detailed structure of the present invention mainly includes a photo taking mechanism (3) assembled in one side of the interior of body (1). That photo taking mechanism (3) includes a brace (31) for mounting a PCBA (32) (printed circuit board assembly), and the camera lens (34) are aimed in the interior of another side of the body (1) by combining the lens frame (33) and lens (34). A positioning frame (12) with a clamping door (13) is set at the internal lower side of the insert-fit groove (11) on the top side of body (1), and a clip-fit seat (21) is set at bottom of the internal side of the lower shell (2). Furthermore, two LED assembling plates (4) are set in the interior of the body (1) and lower shell (2). The brace (31) are further combined with control board (35) and protruding-out button (36) and its outside are covered by a decoration panel (14).

While usage, the processed photos (31) are firstly fixed on the photo clamps (3), the clamp door (13) is opened to put in the photos through the insert-fit groove (11), and the lower end is fixed on the clip-fit seat (21) to just face the photos (3) to photo taking lens (34). After pressing the button (36), the light emitting from each of the LEDs (41) on the two LED assembling plates (4) are controlled, projected on the photos (31) and photos are taken at the same time. Thus the exact same images as the photos are accessed and processed by programs then transferred into digital data for convenient storage, modification or copying then printing the new photos.

By summarizing the aforementioned, with the provision of the present, the ordinary users all can reproduce images from any photos then transfer into digital data for further usage immediately under easy and simple operations and without excellent photo taking technologies and professional equipments. The known troubles are thus solved.

I claim:

1. A device to transfer photo images into digital data including a body and a lower shell to be assembled as a shallow structure, wherein a photo taking mechanism and an LED (light emitting diode) assembling plate are set inside and insert-fit grooves are set at sides of a top portion to provide an insertion for a photo clamp, and the photos taking from photo clamps through internal photo taking mechanisms are transferred into digital data;

wherein a positioning frame with a clamping door is set at the internal lower side of the insert-fit groove, and a relative clip-fit seat is set at a bottom of the internal side of the lower shell.

2. The device to transfer photo images into digital data as claimed in claim 1, wherein the photo taking mechanism includes a brace for mounting a PCBA (printed circuit board assembly), and a camera lens is aimed in the interior of another side of the body by combining a lens frame and lens.

3. The device to transfer photo images into digital data as claimed in claim 1, wherein a brace is further combined with a control board and a protruding-out button, and its outside is covered by a decoration panel.

* * * * *